United States Patent [19]

Abbott et al.

[11] 3,827,032

[45] July 30, 1974

[54] DIFFERENTIALLY COUPLED MEMORY ARRAYS

[75] Inventors: Warwick R. Abbott, Woburn; Theodore C. Chen, Concord, both of Mass.

[73] Assignee: Integrated Memories, Inc., Wilmington, Mass.

[22] Filed: June 19, 1972

[21] Appl. No.: 264,000

[52] U.S. Cl. 340/173 SP, 340/173 CA, 340/174 SP

[51] Int. Cl. ........................ G11c 11/24, G11c 17/00

[58] Field of Search ... 340/173 CA, 173 SP, 174 SP

[56] References Cited

UNITED STATES PATENTS

| | | | |
|---|---|---|---|
| 3,003,143 | 10/1961 | Buirrier | 340/173 SP |
| 3,183,490 | 5/1965 | Cubbage | 340/173 SP |
| 3,319,233 | 5/1967 | Amemiya | 340/174 DA |
| 3,350,691 | 10/1967 | Faulis | 340/173 SP |
| 3,383,663 | 5/1968 | David | 340/173 SP |
| 3,404,382 | 10/1968 | Rosenhelk | 340/173 SP |
| 3,506,969 | 4/1970 | Abbas | 340/173 SP |

*Primary Examiner*—Terrell W. Fears

[57] ABSTRACT

A read-only memory plane has a plurality of storage elements arranged in a matrix of columns and rows. Drive means are associated with the columns of elements for energizing the elements and a plurality of sense lines are associated with the row of elements for determining the information content of the storage elements. A second matrix of storage elements is within the memory plane in tandem with the first matrix of elements. A second set of drive means and sense lines are provided for the read-out of the second array of storage elements. The information read-out is manifest in the presence or absence of signals induced in the sense lines when the storage elements are energized. Pairs of sense lines one in each pair from the first array and the other from the second array, are coupled to respective differential amplifiers for amplifying the induced signals and for rejecting any stray signals including background noise which would be common to the two arrays.

9 Claims, 5 Drawing Figures

DIFFERENTIALLY COUPLED MEMORY ARRAYS

BACKGROUND

This invention relates to a data storage device for computers or the like, and more particularly to memory devices having storage elements in a planar array.

While the invention may be practiced with any memory plane employing arrays of storage elements and a plurality of sense lines for information read-out, the invention is discussed relative to read-only applications. A memory device is considered "read-only" if the information stored is not alterable at electronic speeds. Most read-only memories are word-organized or linear-select stores. Drive means cause the storage elements to be energized by means of an address signal and the siganl is in turn selectively coupled through the storage elements to the sense lines.

Read-only memories were first employed in telephone systems. With the development of the computer new applications for read-only memories (ROM) were found. In the ENIAC a resistive type ROM was used to store mathematical functions. Present day computers use ROMs for storing microprograms and tables of code conversion as well. Many types of ROM are widely employed. The principal ones are resistive, inductive, and capacitive arrays. Generally, the arrays are in matrix form with the columns being drive word lines and the rows being sense lines. For purposes of illustration the invention is disclosed in a capacitive read-only embodiment.

The capacitive read-only memory is based upon the principle that a capacitance exists between any two conductors which are in proximity to each other. A voltage pulse on one conductor will be coupled to the other by this capacitance. A capacitive memory array usually consists of pairs of printed circuit boards, one having word or drive conductors and the other having sense conductors. The boards are arranged so that the sets of conductors are orthogonal to each other. A capacitance exists between the drive and sense lines at the points of crossing. Each of these points is considered a bit position.

Data can be stored by the interposition of a metallized sheet which has a plurality of apertures located in the sheet at certain of the bit positions. For example, where the apertures exist, a binary ONE would be represented; where there are no apertures at bit positions, a binary ZERO would be represented. The presence or absence of an aperture is sensed electrically by a sense conductor or line when a voltage pulse is applied to a drive conductor or line. At a bit position having an aperture in the ground plane, the voltage will be capacitively coupled through the aperture to a sense line indicating a ONE. At a bit position where there is no aperture in the ground plane, the ground plane acts as an electrostatic shield to prevent any coupling to a sense line, thereby indicating a ZERO.

A problem inherent in such a memory array is that undesired stray signals, which are often referred to as noise, are generated from capacitances and other electrical characteristics inherent in the memory configuration. Such noise only serves to degrade the ONE/ZERO ratio.

It is thus an object of the present invention to provide a memory plane which improves substantially the ONE/ZERO ratio.

It is a further object of the present invention to provide a memory plane which minimizes the effect of noise upon the integrity of the information signal.

It is yet another object of the present invention to provide a read-only memory which has output signals with a high information signal to noise ratio.

It is still another object of the present invention to provide a capacitive ROM which rejects noise to substantially improve the information signal read-out.

Other objects of the invention will be evident from the description hereinafter presented.

SUMMARY OF THE INVENTION

The invention provides a memory plane which has a plurality of storage elements arranged in a matrix of columns and rows. Drive means are associated with the columns of elements for energizing the storage elements and a plurality of sense lines are associated with the rows of elements for determining the information content of the storage elements. In an illustrative embodiment the invention provides a capacitive read-only memory which has plurality of sense lines and pads in association with a conductive ground plane for defining the information content of the memory. The sense pads are precisely registered with coupling apertures located in the ground plane. The sense lines and pads are spaced from the ground plane by a thin sheet of insulation. To achieve the necessary registration of elements and closeness of the sense pads and the ground plane, it is preferable that a thin sheet of insulation with metallized sides be initially provided. The sense lines and pads are etched on one side; the coupling aperture are etched in the other metallized side, which serves as the ground plane.

The invention further provides a plurality of conductive drive lines which are laminated to the ground plane side of the information content bearing sheet. A thin layer of insulation is provided between the ground plane and the drive lines. The drive lines are first etched upon a nonconductive substrate and then laminated to the insulated ground plane. The drive lines are aligned orthogonal to the sense lines and in registration with the sense pads and the ground plane apertures. The layer of insulation is sufficiently thin to allow capacitive coupling between the drive and sense lines.

Another feature of the invention is that an additional memory storage portion is provided in combination with the already defined storage portion. Another metallically coated insulation sheet is provided with etched sense lines, pads, and ground plane apertures. Drive lines are etched upon the opposite side of the non-conductive substrate. The ground plane of the second information content bearing sheet is then insulated from and mated with the second plurality of drive lines.

Yet another feature of the invention is that the elements of the second storage portion of the fully integrated memory plane are a mirror image of the first storage portion, except for a possibly different information content.

Still another feature of the invention is that pairs of sense lines, one in each pair from the first storage array and the other from the second storage array, are coupled to respective differential amplifiers for amplifying the memory output signals and for rejecting any stray signals or background noise which would be common to the two arrays.

These and other features which are considered to be characteristic of this invention are set forth with particularity in the appended claims. The invention itself, as well as additional objects and features thereof, is further disclosed and will best be understood from the following description when considered in conjunction with the accompanying drawings.

DESCRIPTION OF THE PREFERRED EMBODIMENT

Figure 1A:
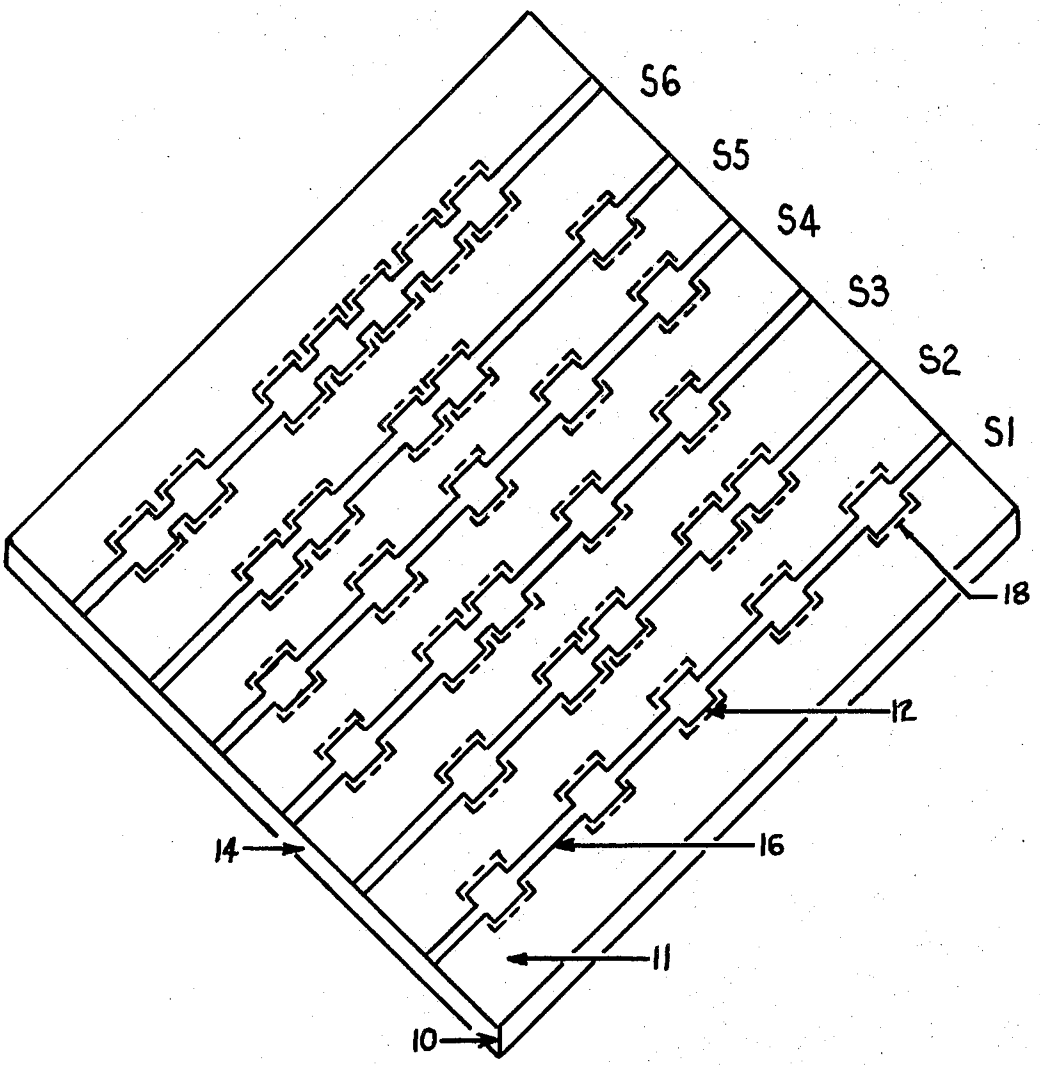
FIG. 1*a* is a perspective view of the information content bearing plane of the illustrative embodiment.
Figure 1B:
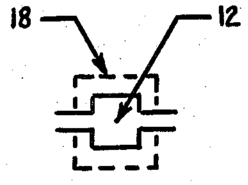
FIG. 1*b* is a detail of FIG. 1*a*.

The information content bearing plane of the illustrative embodiment is shown in FIG. 1. A thin sheet of insulation 10, in FIG. 1 *a*, is initially provided with a thin metallic coating on each of its sides. Preferably, the insulation is of MYLAR and the coating is of copper. The uppermost side 11 is masked and chemically etched to provide a plurality of conductive sense lines S1 . . . S6 which are substantially equidistant and parallel with each other. Each sense line S has a pattern of metallic sense pads 12 along its length. The sense pads 12 may either be etched along with the sense line S, and therefore an integral part of it, or later bonded to the sense line S. In the preferred embodiment, the former method of manufacture is employed.

The other side of the sheet 10 is metallized in order to provide a ground plane 14 for the memory structure. Apertures 18 are chemically etched in the ground plane 14 forming an array which is identical to the array of sense pads 12 on the uppermost side 11 of the sheet 10. As shown more clearly in FIG. 1 *b*, the apertures 18 are greater in area than that of each respective sense pad 12 so that the apertures 18 encompass the sense pads 12. The peripheries of the apertures 18 and the sense pads 12 form concentric squares. This configuration assures a substantial reduction of undesirable fringing capacitance. The sheet 10 functions, as well, as a spacer between the sense lines S1 . . . S6 and the ground plane 14 to insure a uniformity of spacing and therefore uniform and highly reliable electrical characteristics between them.

Figure 2:
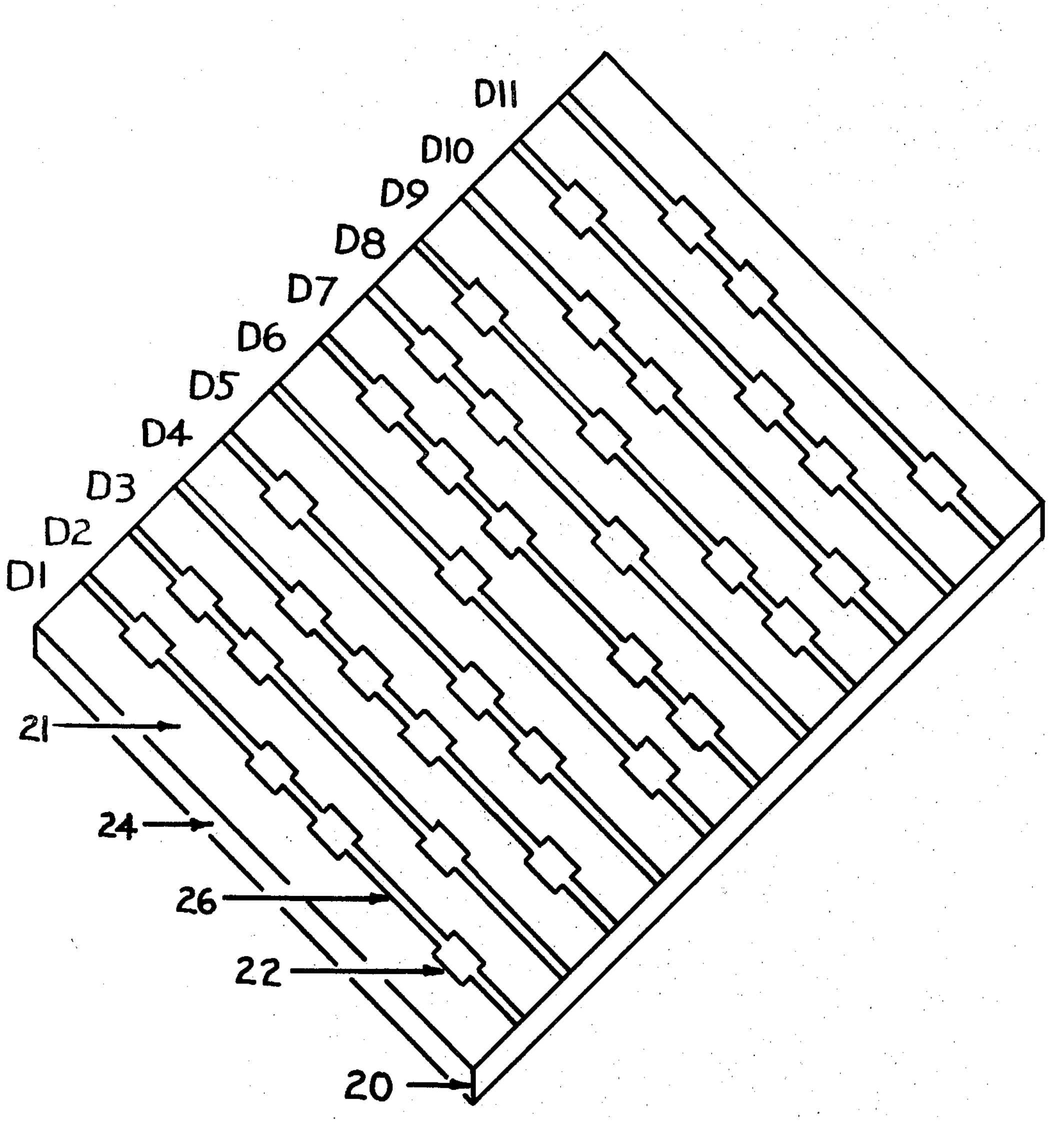
FIG. 2 is a perspective view of the non-conductive substrate and the overlaying plurality of conductive drive lines.

In FIG. 2 a non-conductive substrate 20, such as a printed circuit board, is provided. A plurality of conductive drive or word lines D1 . . . D11 are chemically etched upon the uppermost side 21 of the substrate 20. Prior to etching, the side 21 is preferably metallically coated and masked so as to provide substantially parallel lines D1 . . . D11 with an array of metallic drive pads 22, which is identical to the array of sense pads 14 and apertures 18 of FIG. 1. The drive pads 22, themselves, are of substantially the same shape and size as the sense pads 12.

The substrate 20, carrying the drive lines 22, is laminated to the information content bearing sheet 10 to form the memory plane. The side 21 of the substrate 20 is bonded with an adhesive to the ground plane 14 such that the drive lines D1 . . . D11 are substantially orthogonal to the sense lines S1 . . . S6 and the array of drive pads 22 is mated with the array of sense pads 12 and apertures 18. The intersections between the drive lines D1 . . . D11 and the sense lines S1 . . . S6 mark the bit locations or positions within the resulting memory plane.

Figure 3:
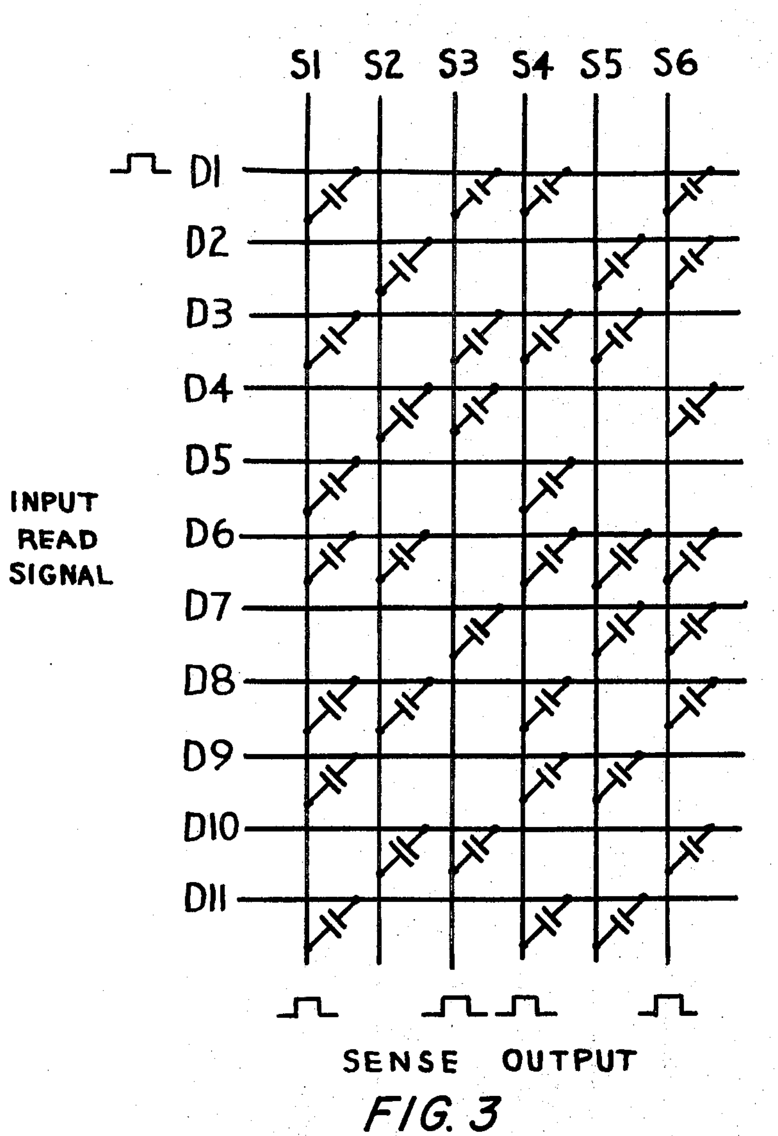
FIG. 3 is a schematic diagram of the functional relationship between the sense and drive lines.

A thin, uniform layer of insulation (not shown) is provided to achieve the bonding and desired mating of the substrate 20 and the sheet 10. Each of the sides of the insulating layer is coated with an adhesive, one side being bonded to the side 21 of the substrate 20 and the drive lines D1 . . . D11 and the other side being bonded to the ground plane 14 of the sheet 10. This interfacing layer of insulation insures a uniformity of spacing between the drive lines D1 . . . D11 and the ground plane 14. Since a uniformity of spacing is also provided between the sense lines S1 . . . S6 and the ground plane 14 by means of the sheet 10, an extremely uniform and highly reliable capacitive coupling is possible between the sense pads 18 and the drive pads 22.

Where such coupling is possible between respective pads 18 and 22 when a voltage is applied to an associated drive line D, it is assumed that a binary ONE is stored. Where portions 16 and 26 of respective lines S and D intersect in the memory plane, there is no coupling possible since at these points the ground plane 14 has no coupling apertures. At such points a binary ZERO is assumed to be stored. The storage matrix of the memory plane is schematically represented in FIG. 3. As shown in FIG. 3, if an input read voltage or signal is applied to drive line D1, the signal is capacitively coupled between respective drive and sense pads 22 and 12 associated with it to be carried by the sense lines S1, S3, S4, and S6 indicating an output of ONE on these lines. The absence of a signal on lines S2 and S6 indicates an output of ZERO on these lines. In this manner, an information word is considered read out of memory. The pulsing by signal means of each drive line D reads a respective word out of the memory plane. For this reason, the drive lines D1 . . . D11 are referred to as word lines.

Another feature of the invention is that the substrate 20 provides for an additional memory storage portion. A second plurality of drive lines and pads are etched upon the opposite side 24 of the substrate 20 and another metallically coated insulation sheet is provided with etched sense lines and pads and ground plane apertures. The ground plane of this second information content bearing sheet is bonded to and insulated from the second plurality of drive lines with an adhesively coated insulation plane, as before. The elements of the second storage portion are, in this preferred embodiment of the two stage fully integrated memory plane, a mirror image of the first storage portion, except for a possibly different information content.

Figure 4:
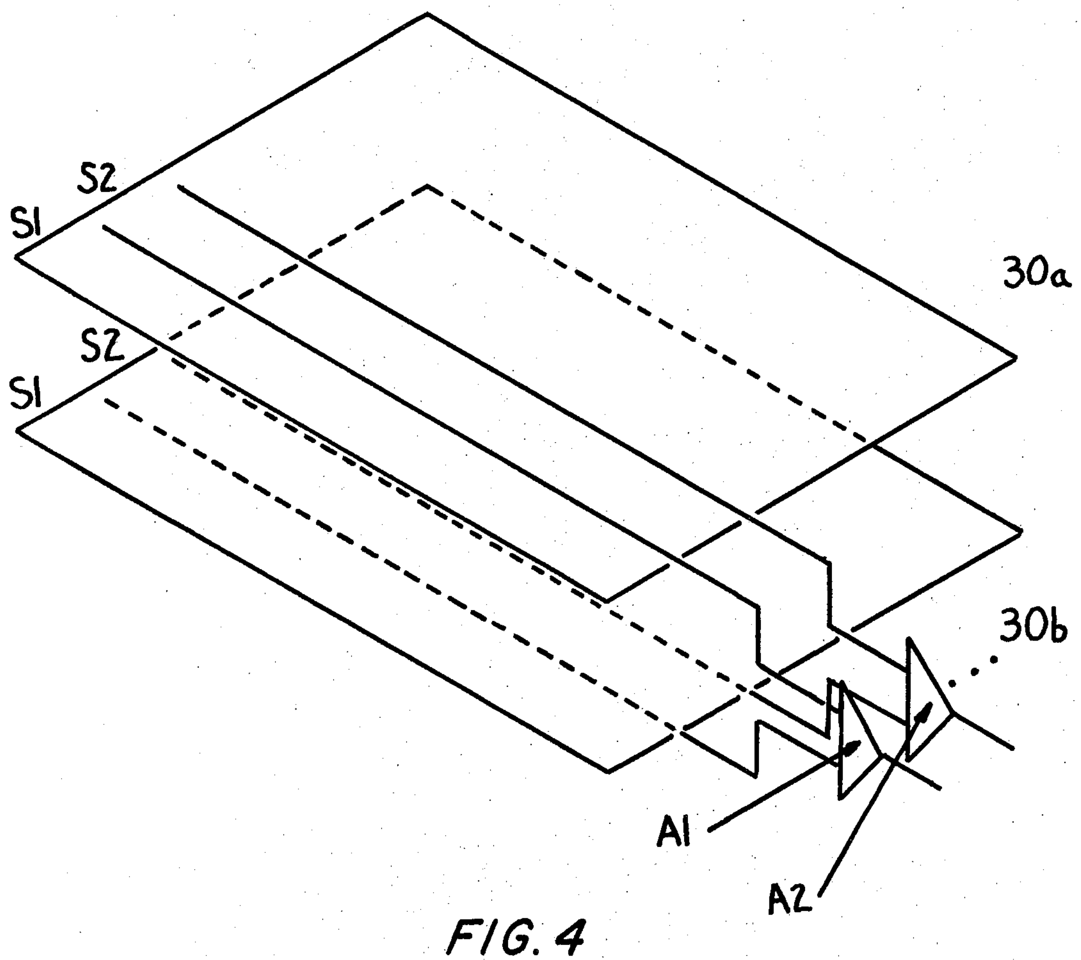
FIG. 4 is a schematic drawing depicting the coupling of pairs of sense lines to respective ones of sense amplifiers, embodying certain features of the invention.

The sense lines are paired, one in each pair from the first array 30*a* and the other from the second array 30*b*, and coupled to respective differential amplifiers A1, A2, . . . as shown in FIG. 4. Such coupling of the sense lines to the amplifiers A1, A2, . . . provides for the rejection of stray signals and background noise which would be common to the two arrays 30*a* and 30*b*. The respective sets of sense lines are connected to a ground potential. One sense line S of a coupled pair is connected to the positive input terminal of an amplifier A, while the other of the pair is connected to the negative input of the amplifier A.

It is important that the two input terminals of the amplifier A are not exposed to output signals carried at the same time on each of the paired sense lines. Therefore, the arrays 30*a* and 30*b* are read at different times. The differential amplifiers A1, A2, . . . are thus not employed for producing a difference signal from two output signals. A differential amplifier suitable for this application would be one designed for common-mode signal rejection. One such amplifier is manufactured by Texas Instruments, model number 7520.

To insure a maximization of noise rejection, the two memory arrays are identical other than provision for differing information content. The spacing between the sense lines, the distances of the sense and drive lines from the ground plane, the spacing between the drive lines, and the dimensions of these memory elements are the same for each of the arrays. Obviously, many modifications of the present invention are possible in light of the above teaching. It is therefore to be understood that, in the scope of the appended claims, the invention may be practiced otherwise than as specifically described.

What is claimed is:

1. A capacitive memory comprising:

a first memory plane having a plurality of conductive sense lines, a plurality of conductive drive lines disposed substantially orthogonal to said sense lines, a ground plane disposed between said sense and drive lines for providing electrostatic shielding between them, said ground plane having a plurality of apertures at certain intersections between said sense and drive lines which define a plurality of coupling boundaries for allowing capacitive coupling between said lines within said boundaries at said locations upon the application of an electronic signal to at least one of said drive lines;

a second memory plane substantially similar in structure and dimension as said first memory plane having sense lines, drive lines and a ground plane having a plurality of apertures at possibly different intersections between sense and drive lines;

differential signal processing means coupling the sense lines associated with said first plane to the sense lines associated with said second plane and means for driving the sense lines associated with said first plane independently from the sense lines associated with said second plane.

2. The memory as defined in claim 1 wherein said signal processing means couples at least one pair of sense lines, one line of said pair being associated with said first plane and the other line being associated with said second plane.

3. The memory as defined in claim 2 wherein said signal processing means comprises a plurality of differential amplifier means, each of which couples said pairs of sense lines for amplifying any signals induced in said sense lines, for indicating the information content of the memory planes, and for rejecting any undesirable stray signals which would be common to said planes.

4. The memory as defined in claim 3 wherein said memory planes form parallel planes which are in tandem with one another.

5. The memory as defined in claim 4 wherein said second memory plane is a mirror image of said first memory plane provided that the information content of said planes may be different.

6. A capacitive memory comprising:

a first memory plane having a plurality of conductive sense lines and a plurality of conductive drive lines disposed substantially orthogonal to said sense lines;

a second memory plane substantially similar in structure and dimension as said first memory plane having sense lines and drive lines;

differential signal processing means coupling the sense lines associated with said first plane to the sense lines associated with said second plane; and means for driving the sense lines associated with said first plane independently from the sense lines associated with said second plane.

7. The memory as defined in claim 6 wherein said signal processing means couples at least one pair of sense lines, one line of said pair being associated with said first plane and the other line being associated with said second plane.

8. The memory as defined in claim 7 wherein said signal processing means comprises a plurality of differential amplifier means, each of which couples said pairs of sense lines for amplifying any signals induced in said sense lines, for indicating the information content of the memory planes, and for rejecting any undesirable stray signals which would be common to said planes.

9. The memory as defined in claim 8 wherein respective ground planes are disposed between the sense and drive lines of said first and second planes, each of said ground planes having a plurality of apertures at certain intersections between said sense and drive lines which define a plurality of coupling boundaries for allowing capacitive coupling between said lines within said boundaries at said locations upon the application of an electronic signal to at least one of said drive lines.

* * * * *